(No Model.)
E. MIGNAULT.
UNIVERSAL ANGULAR KNUCKLE JOINT.
No. 289,120. Patented Nov. 27, 1883.
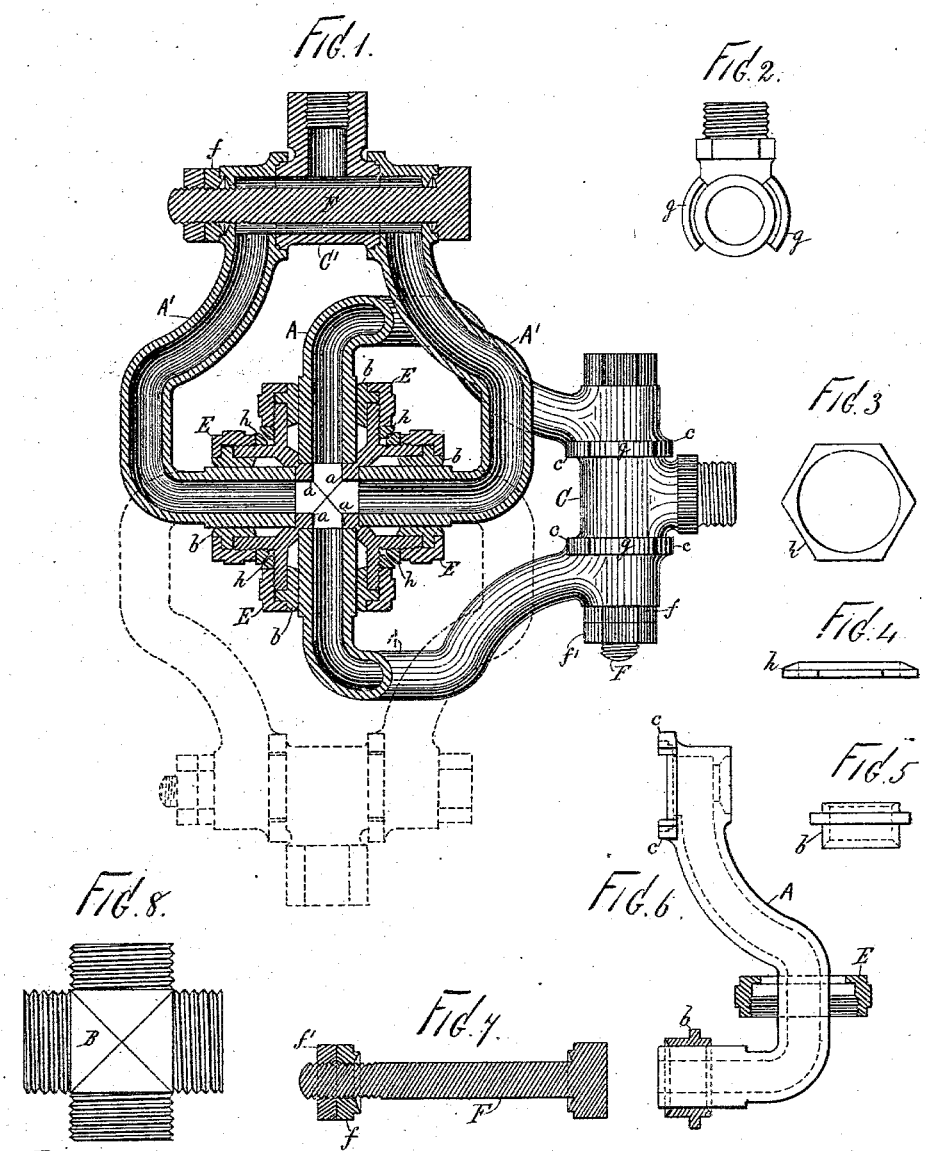

UNITED STATES PATENT OFFICE.

EUSEBE MIGNAULT, OF NEW YORK, N. Y.

UNIVERSAL ANGULAR KNUCKLE-JOINT.

SPECIFICATION forming part of Letters Patent No. 289,120, dated November 27, 1883.

Application filed May 2, 1883. (No model.)

*To all whom it may concern:*

Be it known that I, EUSEBE MIGNAULT, of New York city, county of New York, and State of New York, have invented certain new and useful Improvements in Universal Angular Knuckle-Joints, of which the following is a full, clear, and exact description, reference being had to the accompanying drawings, and to the letters of reference marked thereon.

My improvements have relation to pipe-couplings for use in connection with pipes intended to convey air, gas, steam, water, or other fluids or liquids, such as shown and described in the United States Letters Patent for my improvement in universal angular knuckle-joints, dated November 21, 1882, No. 267,706.

In these couplings, made of metal, the two sections or parts, being interposed between two sections of a pipe or conduit, furnish an adjustable or universal joint between said sections of pipe, so that they (the sections) may be inclined to any angle with respect to each other, or made to approach or recede from each other within certain limits, in the same manner and for like purposes, as in the case of the elastic joint or coupling commonly known.

The objects of my present invention are to simplify and improve the means of connecting the ends of the movable arms or branches or goose-necks with the T-pieces which form the ends of the coupling, so that the parts may be more easily, readily, and rapidly secured, and at less cost for construction; to provide a cheap and serviceable filling-ring or packing-gland, by use of which the packing-nuts may be made of larger interior bore, and therefore more readily and easily moved back upon the curved arms for convenience in assembling or disuniting the parts, and to provide a cheap and serviceable means of preventing the T-pieces from turning on the arms or goose-necks and of packing the joints.

To accomplish these objects my improvements involve certain novel and useful peculiarities of construction, relative arrangements or combinations of parts, and details of manufacture, all of which will be herein first fully described, and then pointed out in the claims.

In the accompanying drawings, forming part of this specification, Figure 1 is a horizontal section and partial plan of a metallic pipe-coupling or universal pipe-joint constructed and arranged for operation in accordance with my invention, the dotted lines indicating one of the positions to which one of the two sections of the coupling may be adjusted. Fig. 2 is a front elevation, showing the end of one of the T-pieces. Fig. 3 is a plan, and Fig. 4 an edge, view of the jam-nut applied upon the threaded branches of the main cross-piece. Fig. 5 is an elevation of the packing-gland or filling-ring. Fig. 6 is an elevation of one of the hollow arms or goose-necks, the packing-nut and packing-gland being shown in section thereon and the nut being moved back on the curved arm. Fig. 7 is a sectional view of one of the coupling-bolts with its nut and jam-nut in place. Fig. 8 is a plan of the central or main connecting-piece.

In all these figures like letters of reference, wherever they occur, indicate corresponding parts.

A A and A' A' are the hollow goose-neck branches or arms of the coupling. The inner ends of these branches enter the sockets formed for them in the connecting piece or box B, abutting against narrow ledges $a\,a$, formed by suitably boring the metal for the central passages. The other ends of the branches or goose-necks receive the hollow T-pieces $c\,c'$, as shown in Fig. 1, and these T-pieces are held in place by the abutting parts of the goose-necks, the latter being secured by a bolt, as at F, and its corresponding nut, $f$, and jam-nut $f'$. The joints between the goose-necks and T-pieces are ground or plain. The bolt is made of a diameter somewhat smaller than that of the interior bore of the T-piece, so that ample room will be provided for the movement of liquids or fluids around the bolt, or their passage to the hollow arms or escape from the T-pieces. The head of the bolt is cut, as shown in Figs. 1 and 7, and enters a slight recess in the end of the arm, as shown in Fig. 1, the recess in the bolt-head being for the purpose of accommodating a bit of packing material by which the joint is made secure. The nut $f$ is similarly constructed. By any ordinary wrench the nut may be turned down as tightly as may be desired, and the T-piece be thus properly secured in place. The bolt is easily and quickly removable. This method of connecting the arms or goose-necks with the T-pieces is simple and obviates the making of screw-threads on the T-pieces, as well as fitting coupling-nuts upon the ends of the arms. The packing-glands b are provided with flanges to project over the ends of the central cross-piece, and are firmly held in proper place by the packing-nuts E, which are secured upon the ends of the cross-piece. The arms make an abrupt turn to enter the cross-piece, and it is desirable to unturn the packing-nuts and to slip them back upon the arms out of the way, both for convenience in repacking the implement and in assembling the parts.

In order that the packing-nuts may be moved back upon the arms without difficulty, I make the central bore in the head of each amply large, so that the nut may be easily moved over the bend in the arm upon which it is mounted, and then fit this bore with the projecting part of the filling ring or gland b. The gland is crowded into place by the packing-nut, and a secure joint thus effected. The end of the arm or goose-neck which enters the connecting-piece is slightly enlarged, so that the gland can be easily slipped back when required.

To secure the packing-nuts from accidental unturning during use of the device, the ordinary jam-nuts may be employed, if desired. These are represented at h h, fitting the threads on the cross-piece, and intended to be turned up against the ends of the packing-nuts after the latter are properly located. The flange on the end of the T-piece is cut away at two parts, leaving projections g g, Figs. 1 and 2, which enter corresponding recesses formed by cutting away the flanges on the abutting ends of the arms, and leaving two projections thereon, as at c c. The projections on the T-piece fitting into the recesses on the arms, and the projections on the arms at the same time entering the recesses on the T-pieces, form a positive clutch. When the parts are located together, by the proper application of the coupling-bolt the T-piece will be prevented by the clutch from turning on the arms, in a manner readily understood, and this will obviate wear of the joints and the consequent destruction of the packing employed on the bolt, compelling the T-piece and the arms to move together. This arrangement is simple, and the exteriors of the flanges being circular can be turned up in the ordinary lathe, the recesses and flanges being provided by use of a simple cutting or milling tool.

The improvements above described are well calculated to simplify the construction of the coupling, and they are found to admirably answer the purposes or objects of the invention, as previously stated.

Having now fully described my invention, what I claim as new, and desire to secure by Letters Patent, is—

1. In a universal pipe-coupling or knuckle-joint, the end T-piece, connected with the hollow movable arms or goose-necks by a bolt passing through the abutting ends of the arms, substantially as shown and described.

2. The combination of the hollow arms or goose-necks, the central cross-piece receiving the inner ends of said arms, the end T-pieces, C and C', and the bolt F and nut f, substantially as shown and described.

3. In a pipe-coupling of the character herein set forth, the hollow bent arms or goose-necks entering the central cross-piece, the packing-nuts applied upon the cross-piece, and the independent filling-rings or packing-glands, arranged and combined substantially as and for the purposes set forth.

4. In a pipe-coupling of the character herein set forth, the hollow bent arms or goose-necks, recessed at their outer ends, as explained, and the T-pieces, correspondingly recessed, for the purpose of preventing independent movement, substantially as and for the objects set forth.

In testimony that I claim the foregoing I have hereunto set my hand in the presence of two witnesses.

E. MIGNAULT.

Witnesses:
 JOHN BUCKLER,
 WORTH OSGOOD.